United States Patent [19]
Barber

[11] Patent Number: 5,316,431
[45] Date of Patent: May 31, 1994

[54] AUTOMATIC LOADING DEVICE FOR BALES OF HAY, ALFALFA AND THE LIKE

[76] Inventor: Manuel C. Barber, Ctra. de Tarrega a Balaguer, s/n, 25332 La Fuliola, Lleida, Spain

[21] Appl. No.: 907,333

[22] Filed: Jul. 1, 1992

[30] Foreign Application Priority Data

Sep. 3, 1991 [ES] Spain .................................. 9101969

[51] Int. Cl.$^5$ .................................. B60P 1/36
[52] U.S. Cl. .................................. 414/523; 414/528; 414/111; 414/505; 414/776; 198/316.1; 198/317; 198/861.6
[58] Field of Search ............... 414/523, 502, 503, 504, 414/505, 527, 528, 24.5, 789.7, 111, 776, 754, 551–554; 198/312, 317, 318, 315, 316.1, 409, 861.4, 861.5, 861.6, 463.3, 631

[56] References Cited

U.S. PATENT DOCUMENTS

| | | | |
|---|---|---|---|
| 2,796,162 | 6/1957 | Bellingham | 198/317 X |
| 4,322,198 | 3/1982 | Zuber | 414/776 X |
| 4,352,422 | 10/1982 | Meyers et al. | 198/408 X |
| 4,662,812 | 5/1987 | Busboom et al. | 414/505 X |
| 4,832,553 | 5/1989 | Grey et al. | 414/111 X |

FOREIGN PATENT DOCUMENTS

| | | | |
|---|---|---|---|
| 159687 | 6/1953 | Australia | 414/523 |
| 203837 | 12/1955 | Australia | 414/523 |
| 2829460 | 1/1980 | Fed. Rep. of Germany | 414/111 |
| 9001845 | 6/1993 | Spain . | |
| 888780 | 2/1962 | United Kingdom | 414/754 |
| 2005219 | 4/1979 | United Kingdom | 414/111 |

Primary Examiner—Frank E. Werner
Attorney, Agent, or Firm—Steinberg, Raskin & Davidson

[57] ABSTRACT

A ramp (1) is provided with spiked chains (2) for handling bales (4), movable from a gathering position, parallel to the direction of advance of the trailer (8) and inclined with respect to the horizontal plane, for gathering the bale from the ground, to a loading position, at right angles to the direction of advance of the trailer (8) and at the same height as its platform, for loading the bale onto the trailer (8), characterized in that the movement of the ramp (1) between the positions is effected in a single rotation around a geometrical axis which is fixed with respect to the trailer (8), the fixed geometrical axis being inclined with respect to the horizontal plane and with respect to the vertical plane containing the longitudinal axis of the trailer (8).

15 Claims, 4 Drawing Sheets

AUTOMATIC LOADING DEVICE FOR BALES OF HAY, ALFALFA AND THE LIKE

The present invention refers to a device for the automatic loading of bales of hay, alfalfa and the like which may be attached to a self-loading trailer.

BACKGROUND OF THE INVENTION

There are known devices able to gather bales and perform a series of operations with the objective of depositing them on the platform of a self-loading trailer.

Spanish Utility Model No. 9001845, in the name of D. Manuel Cusiné Barber, who is also titleholder of the present application, describes a device of this type which comprises a tiltable ramp, provided with a system of chains for gathering the bale from the ground and hydraulic cylinders for lifting it to a horizontal position, and a turnable platform which receives the bale from said ramp and is provided with an hydraulic cylinder to turn in a horizontal plane and with a manual pushing device for placing the bale on the trailer.

Other known embodiments of devices of this type envisage a single frame, also provided with a system of traction chains, which gathers the bale from the ground and performs two successive movements, each of them operated by an hydraulic cylinder, respectively placing the bale in a horizontal plane and orienting it in the appropriate direction.

In these known devices it is necessary to accomplish at least two independent, successive, movements in order to load the bale onto the trailer, for lifting and orienting it respectively, thus they require the presence of at least two mechanical actuators—for example hydraulic cylinders. As a consequence these known devices are relatively costly and slow.

DESCRIPTION OF THE INVENTION

The present invention resolves the aforementioned drawbacks by means of a device for the automatic loading of bales of hay, alfalfa and the like onto a trailer, which device comprises a ramp provided with spiked chains for handling the bales. The ramp is movable from a gathering position, parallel to the direction of advance of the trailer and inclined at an angle $\delta$ with respect to the horizontal plane. The device operates to gather the bale up from the ground, and to transfer the bale to a loading position, at right angles to the direction of advance of the trailer and at the same height as its platform, for loading it onto the trailer. The movement of the ramp from said gathering position to said loading position is carried out in a single rotation around a geometrical axis which is fixed with respect to the trailer, said fixed geometrical axis being inclined with respect to the horizontal plane and with respect to the vertical plane containing the longitudinal direction of the trailer.

Defining the inclination of said geometrical axis by the angles $\beta$ and $\alpha$, where $\beta$ is the angle which the axis forms with the horizontal plane, and $\alpha$ the angle that the horizontal projection of the axis forms with the longitudinal direction of the trailer, said angle $\alpha$ is 45° and said angle $\beta$ depends on the inclination $\delta$ of the ramp in the gathering position, according to the relation:

$$\beta = \arccos\left(\left(\frac{2\cdot\sin^2\delta}{2 + \sin^2\delta + 2\cdot\cos\delta}\right)^{0.5}\right)$$

Thus the device of the invention results simpler and more profitable than the known devices, since changing position by means of a single rotation enables a simplification of the mechanical operation and an increase in its operation speed.

In a preferred embodiment the device comprises a hub, fixed to the trailer through a frame formed by a plurality of bars, and a shaft turnable within said hub, said turnable shaft being coupled to the lower side of the ramp, and the axial direction of said hub and said turnable shaft coinciding with the direction of the above mentioned geometrical axis.

The movement of the ramp between the gathering and the loading positions is carried out by means of a single mechanical actuator, preferably an hydraulic cylinder linked with the power outlet of a tractor.

Advantageously the ramp includes a detecting device excited by the bales which is linked to the stop mechanism of the traction chains and to the mechanism for the movement of the ramp, while the mechanical actuator is linked to the start-up mechanism of the traction chains.

In this way the process of gathering and loading the bales is automated by means of a single detecting device which is excited by a bale when, after being gathered, it reaches the upper part of the ramp, so that the chains stop and the rotation to the loading position is effected; when the bale leaves the ramp completely the excitation of the detector ceases, so that the chains stop and the rotation towards the initial position for gathering a new bale is effected.

The link of the mechanical actuator with the start-up mechanism for the chains allows said chains to be started at the end of each rotation, due to the increased pressure that occurs in the hydraulic circuit when the piston of the hydraulic cylinder reaches one of the ends of its stroke.

Thus the automation of the process is significantly simplified.

Advantageously, said frame comprises at least one horizontal bar, at right angles to the direction of advance of the trailer, arranged at an intermediate height between the ground and the platform, and provided, in its upper side, with at least two support blocks on which the ramp rests when it is in the gathering position.

Thus the eventuality is avoided that the bale, when being raised by the ramp, may exercise an excessive bending moment on the shaft and hub assembly which supports the ramp.

BRIEF DESCRIPTION OF THE DRAWINGS

To improve understanding of this description it is accompanied by a number of drawings which, schematically and by way of non-limiting example only, show a practical case of embodiment.

In said drawings.

DESCRIPTION OF A PREFERRED EMBODIMENT

Figure 1:
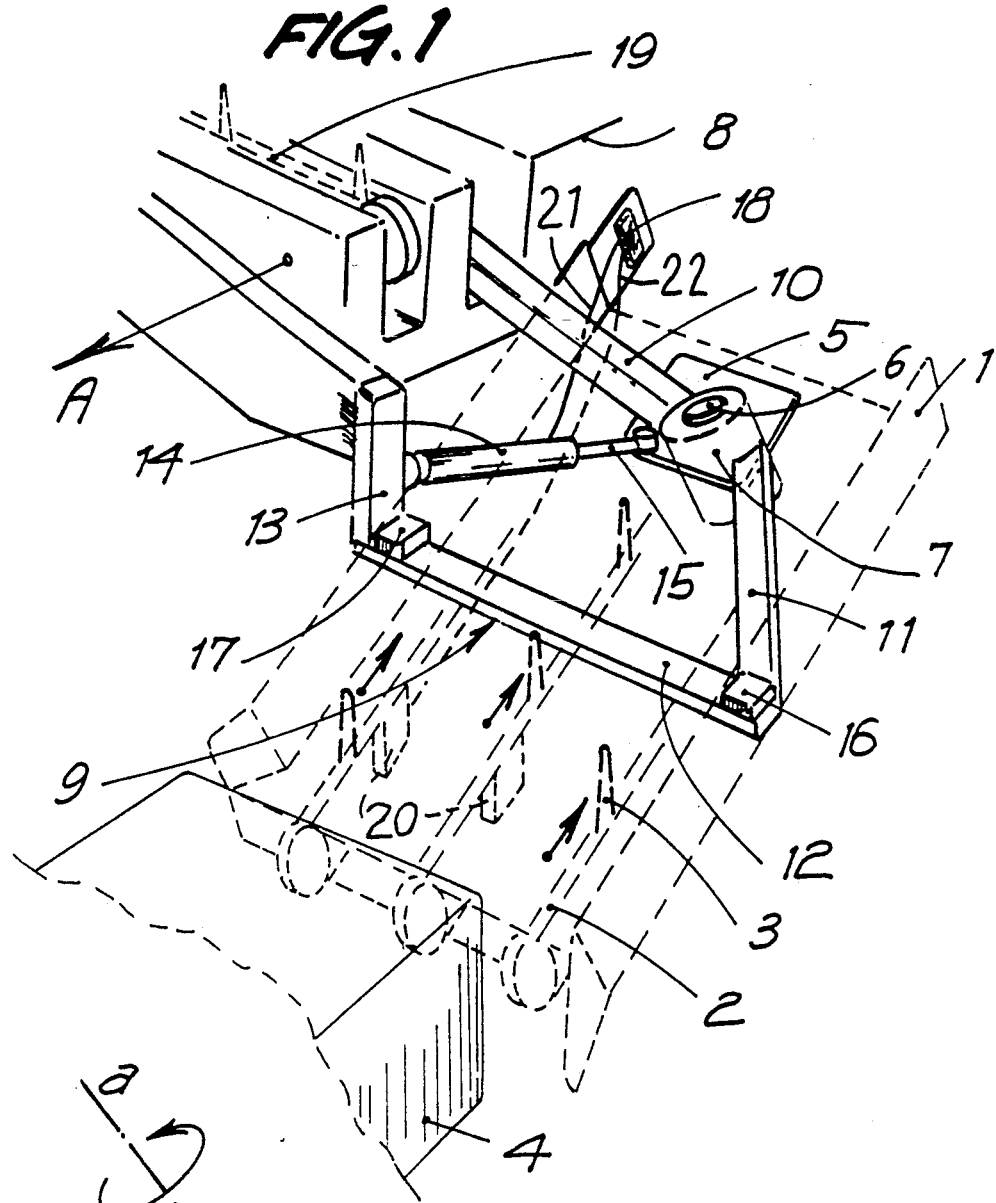
FIG. 1 is a perspective view of the device of the invention, in which the ramp and the traction chains are shown in broken lines for greater clarity.
Figure 3:
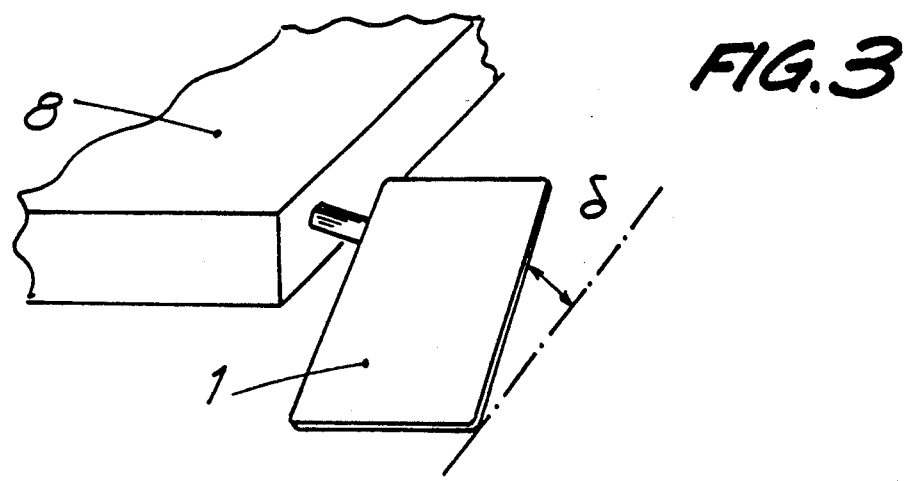
FIG. 3 is a schematic perspective view of the device in the position for gathering bales.
Figure 4:
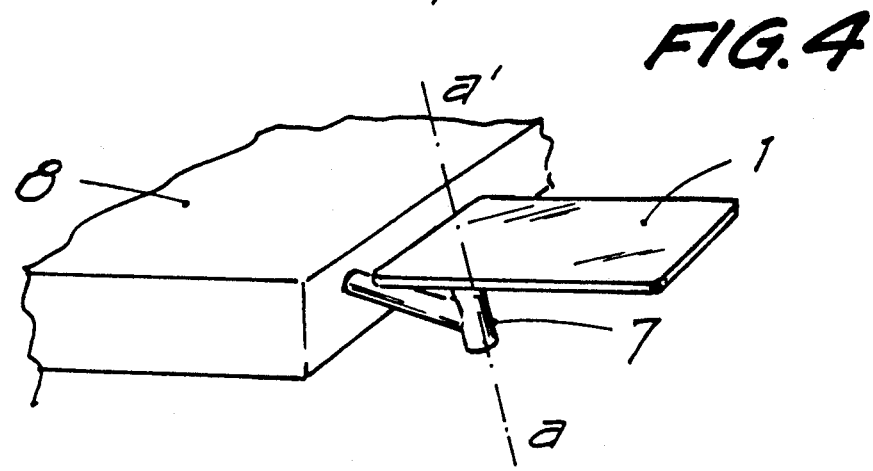
FIG. 4 is an analogous view to that of FIG. 3, with the device in the position for loading bales onto the trailer.
Figure 5:
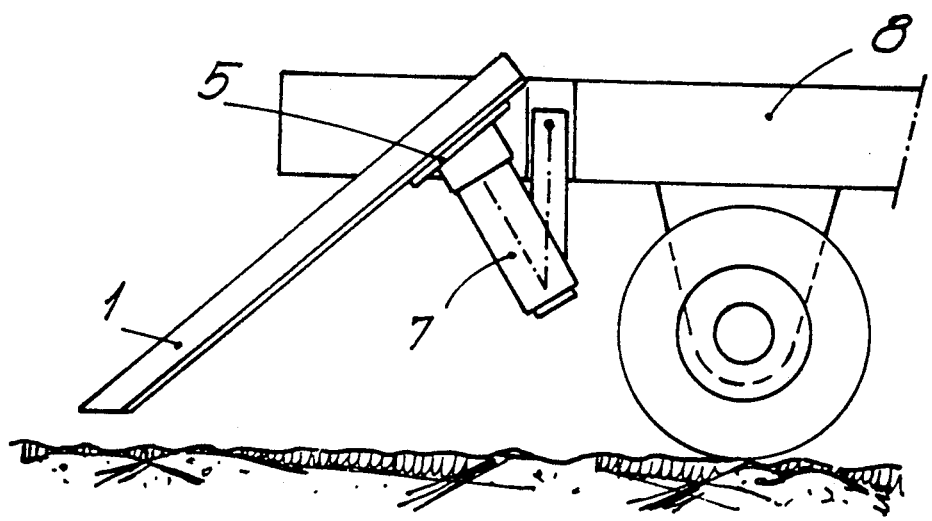
FIG. 5 is a schematic side elevation view of the device in the gathering position.
Figure 6:
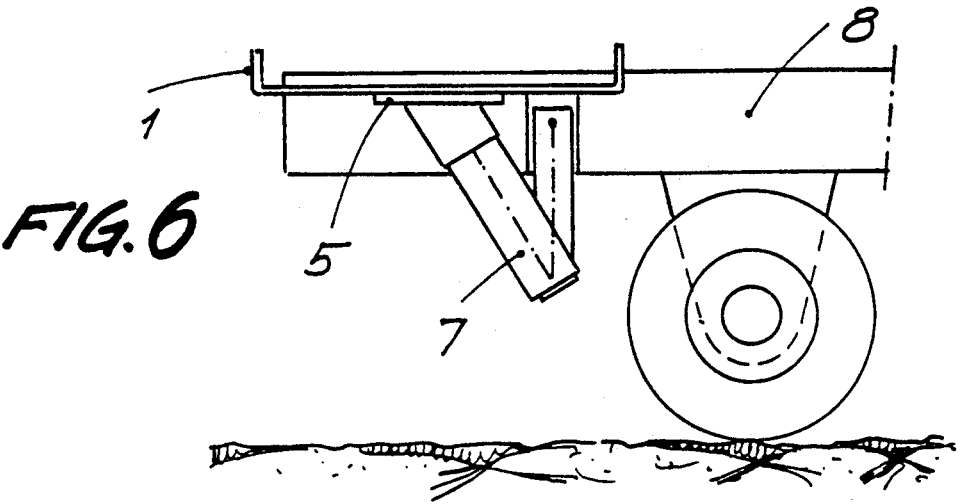
FIG. 6 is an analogous view to that of FIG. 5, with the device in the loading position.
Figure 7:
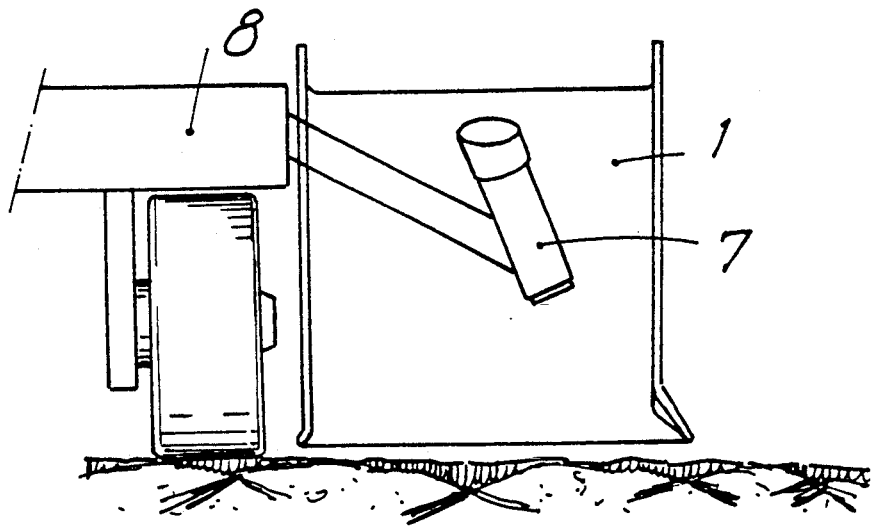
FIG. 7 is a front elevation view of the device in the gathering position.

Referring to FIG. 1, the device of the invention comprises a substantially rectangular ramp -1-, provided with chains -2- with spikes -3- for handling the bales -4-, which can be moved between a bale gathering position, which is shown in perspective in FIG. 3 and in side elevation in FIG. 5, and a position for loading the bales onto the trailer, shown in perspective in FIG. 4 and in side elevation in FIG. 6.

To the lower side of the ramp -1- there is connected a plate -5-, which is joined to a shaft -6-, said shaft being able to turn within a hub -7-.

Said hub -7- is fixed to the platform of a trailer -8-, which advances in the direction indicated by the arrow A, through a frame -9- formed by a plurality of bars -10,11,12,13-.

It is envisaged that the ramp -1- passes from the gathering position of FIGS. 3 and 5, in which the ramp is inclined at an angle $\delta$ with respect to the horizontal plane, to the loading position of FIGS. 4 and 6 by means of a single rotation $\Omega$ of the shaft -6- with respect to the hub -7-.

A mathematical method, which consists substantially in determining the matrix of coordinate system shift between the initial and final positions, equalling it with the matrix of coordinate system shift of a rotation around a fixed axis, and solving the resulting system of equations, allows the determination of the inclination of the geometrical axis aa' of the hub -7- and its shaft -6- that fulfills this desired condition.

Figure 2:
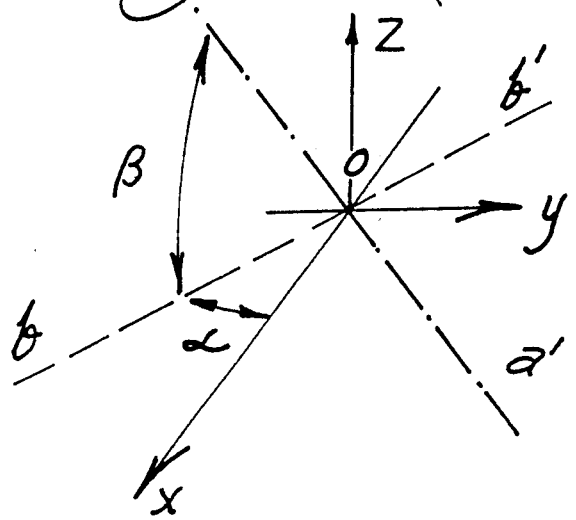
FIG. 2 is a diagram in which the angles defining the inclination of the geometrical rotation axis of the device are shown.

In FIG. 2 this inclination of the geometric axis aa' is shown schematically. The axis Ox represents the longitudinal direction of the trailer -8-, and the axis Oy the transverse direction, and the plane xOy is horizontal. The inclination of the axis aa' is defined by means of the two angles $\beta$ and $\alpha$, where $\beta$ is the angle which the axis aa' forms with the horizontal plane xOy, and $\alpha$ is the angle that the horizontal projection bb' of the axis aa' forms with the longitudinal direction Ox of the trailer -8-.

According to the results of the abovementioned mathematical study the inclination of the axis aa' should be such that:

$$\alpha = 45°$$

$$\beta = \arccos\left(\left(\frac{2 \cdot \text{sen}^2\delta}{2 + \text{sen}^2\delta + 2 \cdot \cos\delta}\right)^{0.5}\right)$$

As is logical the inclination of the axis aa' depends on the inclination $\delta$ of the ramp in the gathering position.

With the hub -7- and the shaft -6- positioned on the axis aa', the angle $\Omega$ which said shaft must turn around aa' to pass from one position to the other is:

$$\Omega = \arcsin(0.5 \cdot (2 + \sin^2\delta + 2 \cdot \cos\delta)^{0.5})$$

For example, if the ramp needs to have an inclination of $\delta = 30°$ in the gathering position, that of the axis aa' needs to be defined by $\alpha = 45°$, $\beta = 69.2°$, and the turn around aa' should be of $\Omega = 93.8°$.

Figure 8:
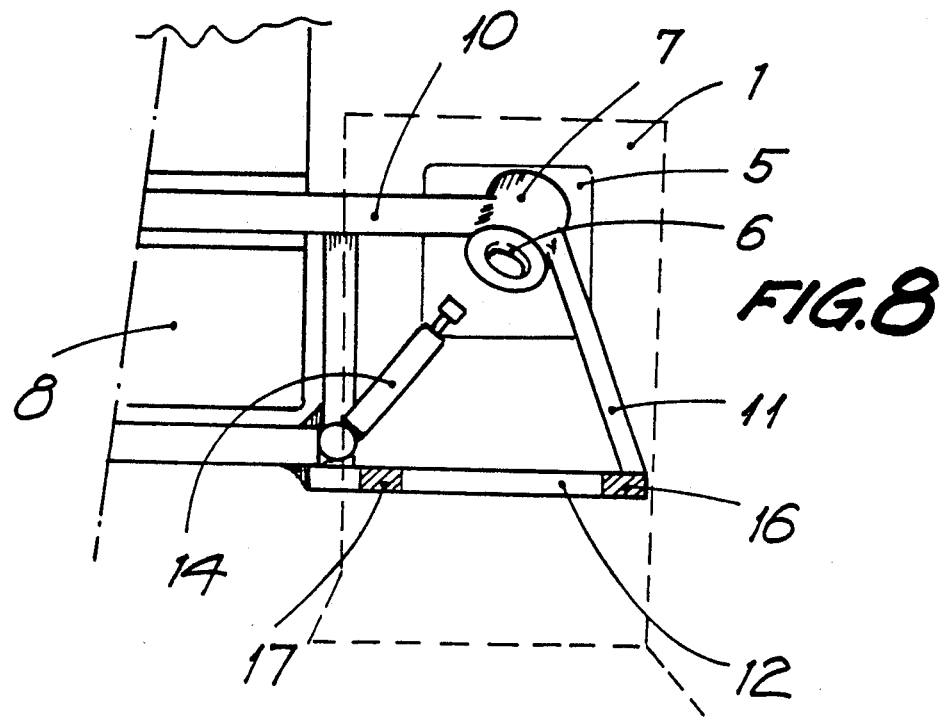
FIGS. 8 and 9 are plan views of the device which show the two end positions of the hydraulic actuator cylinder.

As can be seen from the perspective view shown in FIG. 1, an hydraulic cylinder -14-, whose piston -15- acts on the plate -5- joined to the ramp -1-, supplies the action necessary for the movement from the gathering position to the loading position. The two end positions of the cylinder -14-, completely withdrawn in the gathering position and completely extended in the loading position, are represented in plan view in FIGS. 8 and 9 respectively.

Figure 9:
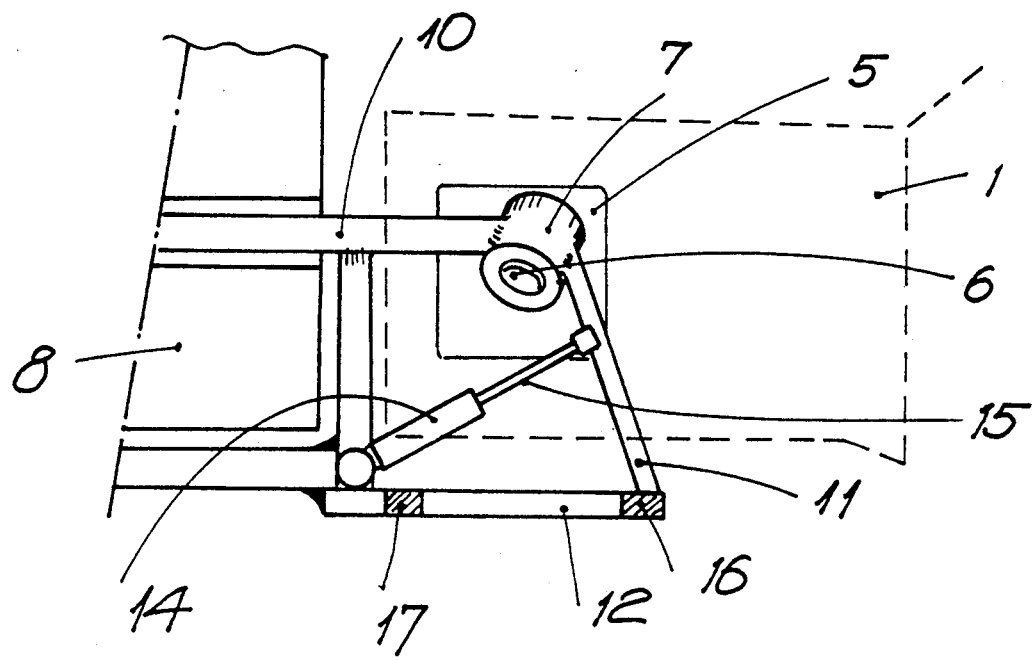

As shown in FIGS. 1 and 9, in the gathering position the ramp -1- rests on two support blocks -16,17- provided on one of the bars -12- of the frame -9-. In this way the eventuality is avoided of imposing an excessive bending moment on the hub -7- and shaft -6- assembly sustaining the ramp -1-, during the raise of a bale -4-.

The device is provided with a detecting device -18- which is excited by the bales -4-, and which is linked by a connector 22 to the stop mechanism for the chains in a traction chain movement device 20 and by a connector 21 to the hydraulic circuit of the cylinder -14- which moves the ramp -1-. Said hydraulic circuit -14- is also linked to the start-up mechanism for the chains -2- in device 20.

The operation of the device of the invention is described below, referring essentially to FIG. 1.

The trailer -8-, normally driven by a tractor (not shown) advances in the direction indicated by the arrow A in order to gather and load the bale -4-. The ramp -1- is initially in the gathering position, with the hydraulic cylinder -14- completely withdrawn, while the chains -2- with spikes -3- are moving. On making contact with a bale -4- the chains catch hold of it, and it moves upwards on the ramp -1-.

When the bale -4- reaches the detector -18- this causes the stop of the chains -2-, so that the bale is retained on the ramp, and the operation of the hydraulic cylinder -14-, whose piston -15- passes to the completely extended position, so that the ramp -1- turns to the horizontal loading position (FIG. 9), with the bale -4- remaining at right angles to the trailer.

When the piston -15- reaches the end of its extension stroke the pressure in the hydraulic circuit increases and this causes a further movement of the chains (2), pushing the bale -4- towards the trailer platform (8) where other chains -19- (FIG. 1) receive it.

When the bale -4- passes onto the platform of the trailer -8- the excitation on the detecting device -18- ceases, causing a new stop in the movement of the chains -2- and the action of the hydraulic cylinder -14-, whose piston -15- withdraws returning the ramp -1- to the gathering position.

When the piston -15- reaches the end of its withdrawal stroke the pressure once more increases in the hydraulic circuit and the chains -2- once again start to move, in order to gather the next bale and repeat the previously described cycle.

I claim:

1. Device for the automatic loading of bales onto a trailer (8), comprising
- a ramp (1) provided with traction chains (2) having spikes (3) for handling bales (4), said ramp (1) being movable from a gathering position in which bales are gathered onto said ramp to a loading position in which the bales are transferred from said ramp onto the trailer, said ramp being mounted for rotation on a geometrical axis (aa'), said axis being fixed to the trailer,
- said ramp being oriented in a moving direction of the trailer and inclined at an angle δ with respect to a horizontal plane when in said gathering position,
- said ramp being oriented at a right angle to the moving direction of the trailer and having a height corresponding to the height of a platform of the trailer when in said loading position,
- means to move said ramp between said gathering position and said loading position in a single rotation (Ω) around the geometrical axis (aa'),
- said geometrical axis (aa') being inclined with respect to the horizontal plane and a vertical plane arranged at a right angle to the horizontal plane, said vertical plane being arranged in the moving direction of the trailer (8), and
- means to move said traction chains to thereby convey the bales along said ramp.

2. Device according to claim 1 in which said geometrical axis (aa') is inclined at angles β and α, where β is the angle which the axis (aa') forms with the horizontal plane and α is the angle that the horizontal projection of the axis (aa') in the horizontal plane forms with the moving direction of the trailer (8), characterized in that said angle α is 45° and said angle β depends on the inclination δ of the ramp (1) in said gathering position according to a relation:

$$\beta = \arccos\left(\left(\frac{2 - \sin^2\delta}{2 + \sin^2\delta + 2 - \cos\delta}\right)^{0.5}\right).$$

3. Device according to claim 1, further comprising
- a frame formed by a plurality of bars and connected to the trailer,
- a hub (7) fixed to the trailer (8) by means of said frame (9), and
- a shaft (6) turnable within said hub (7), said turnable shaft (6) being coupled to a lower side of the ramp (1), an axial direction of said hub (7) and said turnable shaft (6) coinciding with the direction of the geometric axis (aa'),
- said shaft constituting means to fix said ramp on the geometrical axis and said hub constituting means to mount the geometrical axis on the trailer.

4. Device according to claim 3, wherein said frame (9) comprises at least one horizontal bar (12) arranged at right angles to the moving direction of the trailer (8) and between a surface from which the bales are gathered and said platform of the trailer (8), and at least two support blocks (16, 17) arranged on an upper side of said at least one horizontal bar such that said ramp (1) rests on said at least two support points in said gathering position.

5. Device according to claim 1, wherein said means to move said ramp between the gathering and the loading positions consists of a single mechanical actuator (14).

6. Device according to claim 5, wherein said mechanical actuator is a hydraulic cylinder (14).

7. Device according to claim 1, wherein said ramp (1) comprises a detecting device (18) excited by the bales (4),
- said means to move said traction chains being linked to said detection device and being arranged to start and stop the movement of said traction chains (2), and
- said detecting device being linked to said means to move the ramp (1).

8. Device according to claim 7, wherein said means to move said ramp comprise a mechanical actuator (14), said actuator being linked to said means to move the traction chains (2).

9. The device of claim 1, wherein the horizontal plane is arranged in the moving direction of the trailer, said ramp being inclined such that a front edge of said ramp is closer to the horizontal plane than a rear edge of said ramp.

10. The device of claim 9, wherein said front edge and said rear edge are oriented perpendicular to the moving direction of the trailer when in said gathering position, said front edge and said rear edge being oriented in the moving direction of the trailer when in said loading position.

11. A device for automatically loading bales onto a trailer, comprising
- a ramp having a first and second end,
- conveying means to convey bales form said first end of said ramp at which bales are gathered onto said ramp to said second end of said ramp at which the bales are transferred from said ramp to a platform of the trailer,
- means to mount said ramp on an axis about which said ramp rotates, said axis being fixed to the trailer, and
- rotation means to rotate said ramp in a single rotation about said axis from a gathering position in which the bales are gathered onto said ramp to a loading position in which the bales are transferred from said ramp onto said platform,
- said ramp being inclined toward a surface on which the bales are situated and in a moving direction of the trailer when in said gathering position, whereby said first end of said ramp is at a lower height than said second end of said ramp and an angle δ is defined between said ramp and a horizontal plane,
- said ramp being oriented at a right angle to the moving direction of the trailer when in said loading position, whereby said second end of said ramp is at a height corresponding to the height of a platform of the trailer.

12. The device of claim 11, wherein said axis is inclined at an angle β with respect to the horizontal plane, said axis being inclined at an angle α with respect to a vertical plane formed at angle of 90° to the horizontal plane, said vertical plane being arranged in the moving direction of the trailer.

13. The device of claim 12, wherein the angle β is adjustable as a function of the angle δ between said ramp and the horizontal plane.

14. The device of claim 11, further comprising mounting means to mount the axis on the trailer, said mounting means comprising a frame formed by a plurality of bars and connected to the trailer and a hub fixed to the trailer by means of said frame, said means to mount said ramp on the axis comprising a shaft structured and arranged to turn within said hub, said shaft being coupled to a lower side of the ramp such that an axial direction of said hub and said shaft coincides with the direction of the geometric axis.

15. The device of claim 11, wherein said rotation means consist of a single mechanical actuator.

* * * * *